United States Patent [19]

Masuda et al.

[11] Patent Number: 5,169,369
[45] Date of Patent: Dec. 8, 1992

[54] HIGH LOAD FORCE TRANSMISSION BELT

[75] Inventors: Takashi Masuda; Masayuki Tanaka, both of Kobe; Katsuji Tsuji, Shiga; Toshiaki Aragane, Takatsuki; Yasutsugu Kunihiro, Kobe, all of Japan

[73] Assignee: Mitsuboshi Belting Ltd., Kobe, Japan

[21] Appl. No.: 735,286

[22] Filed: Jul. 24, 1991

[30] Foreign Application Priority Data

| Jul. 25, 1990 | [JP] | Japan | 2-198328 |
| Sep. 11, 1990 | [JP] | Japan | 2-241564 |
| Dec. 18, 1990 | [JP] | Japan | 2-412184 |
| Jan. 28, 1991 | [JP] | Japan | 3-008049[U] |

[51] Int. Cl.$^5$ .............................. F16G 1/22
[52] U.S. Cl. .............................. 474/242
[58] Field of Search ............... 474/242, 244–247

[56] References Cited

U.S. PATENT DOCUMENTS

| 1,411,993 | 4/1922 | Dull | 474/242 X |
| 3,949,621 | 4/1976 | Beusink et al. | 474/242 X |
| 4,854,926 | 8/1989 | Hattori | 474/242 |
| 4,891,039 | 1/1990 | Hattori et al. | 474/242 |

FOREIGN PATENT DOCUMENTS

| 0014492 | 8/1980 | European Pat. Off. |
| 0073962 | 3/1983 | European Pat. Off. |
| 0325497 | 7/1989 | France |
| 116146 | 6/1986 | Japan | 474/242 |

OTHER PUBLICATIONS

Japanese Patent Abstract-JP-A-03 074 654 Mitsuboshi Belting Ltd. Mar. 29, 1991 (1 page).

Primary Examiner—Ramon S. Britts
Assistant Examiner—Roger J. Schoeppel
Attorney, Agent, or Firm—Wood, Phillips, VanSanten, Hoffman & Ertel

[57] ABSTRACT

A force transmission belt having a plurality of block bodies each with laterally spaced pulley-engaging surfaces, an endless band to be trained about a pair of pulleys, cooperating structure on the endless band and the block bodies for maintaining the block bodies in an operative position on the endless band with the block bodies slidable lengthwise of the endless band and positioned so that the laterally spaced pulley-engaging surfaces frictionally engage a pulley about which the endless band is trained, and channel structure in at least one of the block bodies for guiding lubricant from a point between adjacent, engaged block bodies and the endless band to a location outside of the one block body to minimize wear between the adjacent block bodies during operation.

35 Claims, 4 Drawing Sheets

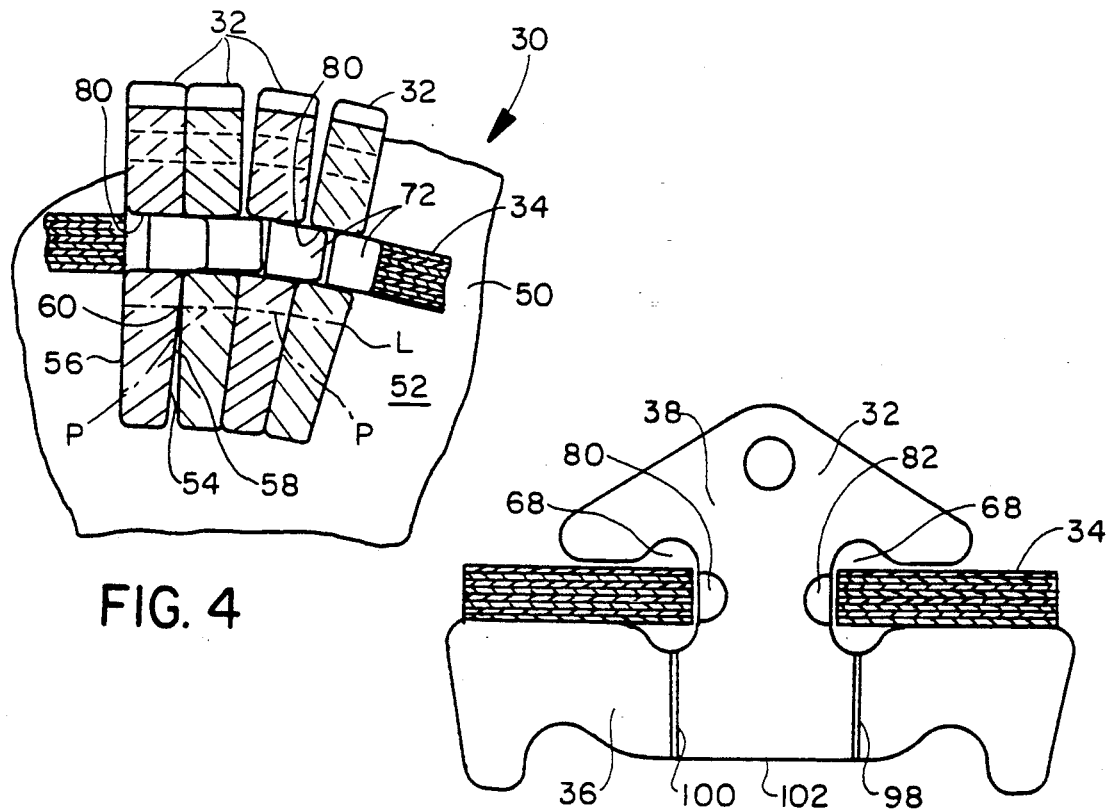
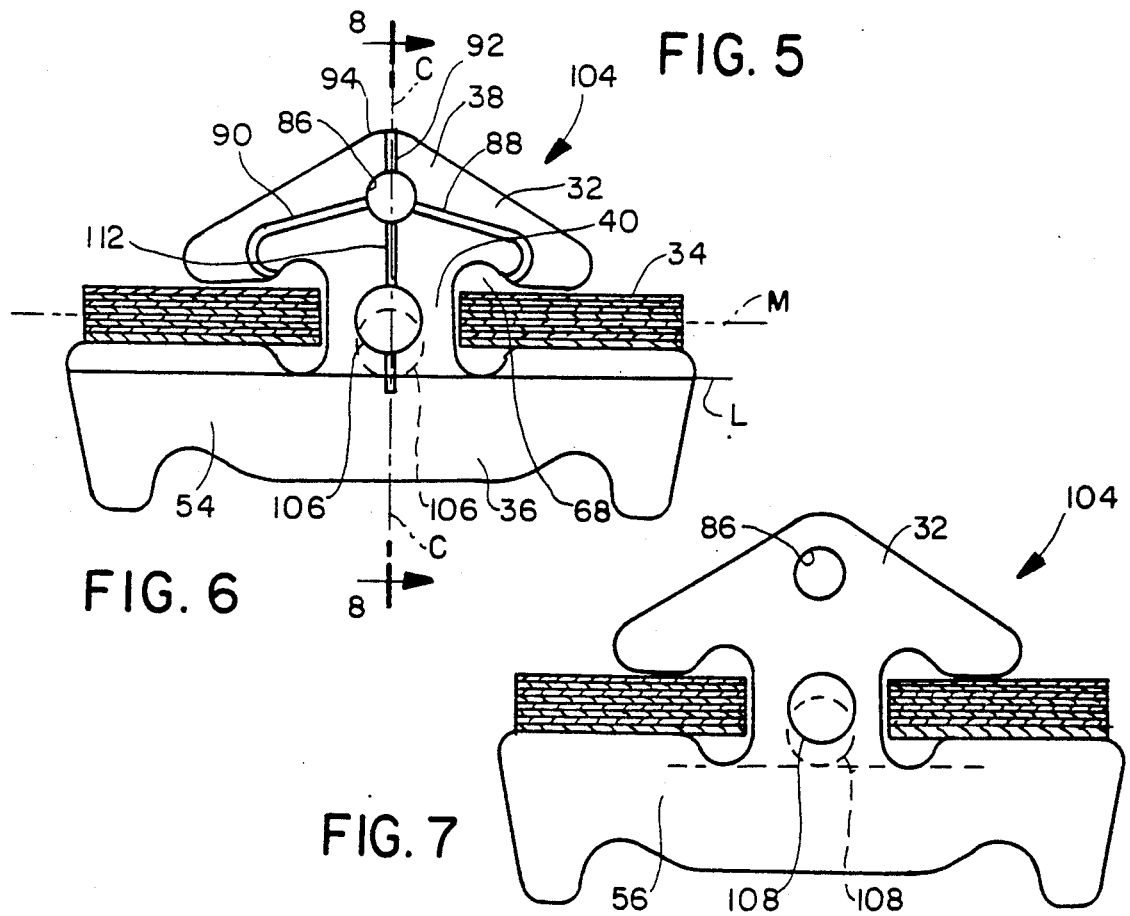

HIGH LOAD FORCE TRANSMISSION BELT

BACKGROUND OF THE INVENTION

1. Field of the Invention

This invention relates to high load force transmission belts and, more particularly, to a transmission belt having a plurality of laterally self adjusting block bodies slidably mounted on an endless band, which belt is particularly adaptable to use in vehicles, such as automobiles, as well as in other environments in which speed change mechanisms are employed.

2. Background Art

High load transmission belts are generally categorized as either 1) pressure force transmission type or 2) tension force transmission type. The former employs a plurality of block bodies mounted in abutting relationship, each to two adjacent block bodies, slidably on an endless, multi-layer, flexible, steel band which is trained about a pair of cooperating pulleys. An exemplary belt of this type is shown in U.S. Pat. No. 3,720,113, to Van-Doorne et al.

In the VanDoorne et al belt, the block bodies gather at the loosened side of the belt as block bodies enter into the grooves of the drive and driven pulleys. The block bodies entering the groove of the drive pulley press the gathered block bodies at the loosened side of the belt to thereby rotate the driven pulley.

In the above type of belt, the block bodies are not interconnected so that their relative positions are not fixed. That is, they are slidable independently of each other along the endless band. Consequently, it is necessary to align the block bodies with each other so that they move consistently and without interference into and out of the pulley grooves. Exemplary guiding structure to accomplish this end is shown in each of Japanese Patent Publication Nos. 57-58543 and 55-100443. The belts disclosed in each of these publications have cooperating projections and receptacles on adjacent block bodies. Each block body has oppositely facing leading and trailing faces. The projections are shown to be on the leading face of each block body.

In designing the belts with cooperating projections and receptacles, designers have dealt with two competing objectives. The first objective is to allow the projections to smoothly enter into and withdraw from the receptacles in operation. This is particularly a problem as the block bodies extend around the curvature of the pulleys. If the projections and receptacles were closely conforming, there would be detrimental interference between the block bodies as the projections moved into and out of the receptacles. To accommodate the belt curvature as the block bodies extend around the pulleys, the receptacles have been made sufficiently large to provide clearance for the projections. This has made difficult the achievement of the second objective of belt designers—that of preventing rattling between adjacent blocks. There is a substantial amount of play permitted between adjacent block bodies which, in use, may result in the block bodies rattling in the absence of perfect alignment therebetween.

Another problem that has plagued the industry is that of the projections fully withdrawing from the receptacles as the block bodies traverse the curvature of the pulleys. If the projections are too tightly received in the receptacles, the block bodies may not completely conform to pulleys, particularly small diameter pulleys. That is, the block bodies tend to bridge across the pulley grooves, which reduces the contact area between the block bodies and the cooperating pulleys. Too loose a fit between the projections and receptacles may result in the block bodies completely separating from each other resulting in misalignment of adjacent bodies and possible prevention of the projection from reentering the cooperating receptacle.

Another problem with the above-mentioned belt systems is that there is a substantial amount of friction generation between the endless band and the block bodies. In FIG. 1 of the drawings herein, a prior art system is shown schematically in which a lubricant is directed outwardly against a belt trained around a pair of pulleys to alleviate this problem. The lubricant is propelled at the point of entry of the block bodies into the driven pulley. The centrifugal force developed by the rotating pulleys causes the lubricant to spray radially outwardly so that much of the lubricant produces no beneficial effect.

In an exemplary belt system of the type described above, each block body has a base, a head, and a neck/pillar connecting between the base and head and defining a slot for reception of an endless band. The block bodies between the drive and driven pulleys are forcibly engaged at the heads and necks/pillars above an inclination line about which the block bodies pivot relative to each other in conforming to a pulley. In operation, there are vibrations which cause contacting block body portions to abrade each other. As a result, the block bodies may wear excessively over time, particularly in environments where the pressure between adjacent block bodies is substantial.

One solution to the above problem has been to increase the contact area between adjacent block bodies. This increases the pressure receiving surface area of each block body to reduce the force per unit area. While this solution does reduce the problem of wear, it also increases the belt weight and causes considerable increase in the centrifugal forces developed at high speed operation of the system. As a result, the transmission capability of the belt may be diminished.

SUMMARY OF THE INVENTION

The present invention is specifically directed to overcoming the above-enumerated problems in a novel and simple manner.

It is the principal objective of the present invention to provide a high load force transmission belt that is: highly durable; self-lubricating; smoothly operable with self-aligning block bodies that are not prone to rattling; readily conformable to relatively small diameter pulleys; and capable of withstanding a substantial amount of pressure during operation without a large surface contact area between adjacent blocks.

More particularly, the invention contemplates a force transmission belt having a plurality of block bodies each with laterally spaced pulley-engaging surfaces, an endless band to be trained about a pair of pulleys, cooperating structure on the endless band and the block bodies for maintaining the block bodies in an operative position on the endless band with the block bodies slidable lengthwise of the endless band and positioned so that the laterally spaced pulley-engaging surfaces frictionally engage a pulley about which the endless band is trained, and channel structure in at least one of the block bodies for guiding lubricant from a point between the one block body and the endless band to a location outside of the one block body to minimize wear between the one block body and the endless band in the vicinity of that point.

In one form of the block body, there is a base portion defining pulley-engaging surfaces, a head portion, and a neck/pillar portion connecting between the base and head portions. The endless band is captively held between the head and base portions.

According to the invention, the channel structure can take a variety of different forms. The channels can be enclosed bores through the block bodies or undercut(s) in at least one face of the block bodies.

In one form, the channel structure includes a channel extending from the bottom side of the one block body base upwardly through the one block body base to the point between the one block body and endless band.

In one form of the invention, one block body has a leading and a trailing face spaced in a fore and aft direction and the channel structure includes a bore extending fully through the one block body in the fore and aft direction. A continuous pathway for the lubricant can be defined from a point between the one block body and endless band to and through the bore in the head. In one form, the bore extends through the head on the one block body.

In one form of the invention, there is a recess in the one block body defining a cavity bounded by the endless band and the one block body to define a lubricant reservoir at the point between the one block body and endless band.

The invention also contemplates the provision of porous material in the channel structure/bore to retain a supply of lubricant. The porous material is provided in at least one of the cavity and the bore.

The invention also contemplates a force transmission belt having a plurality of block bodies each having laterally spaced pulley-engaging surfaces, an endless band to be trained about a pair of pulleys, cooperating structure on the endless band and the block bodies for maintaining the block bodies in operative position on the endless band in which the block bodies are slidable lengthwise of the endless band and positioned so that the laterally spaced pulley-engaging surfaces can frictionally engage a pulley about which the endless band is trained, a projection on one of the leading and trailing faces on a first one of the block bodies, a receptacle for the projection on the other of the leading and trailing faces of a second of the block bodies adjacent to the one block body with the projection being extendable into the receptacle to maintain the first and second block bodies in a desired relative operative relationship, and channel structure in at least one of the first and second block bodies to guide lubricant from a point between at least one of the projection and receptacle to a location outside of the one block body to facilitate movement of the projection within the receptacle and minimize wear between adjacent block bodies in operation.

The lubricant at the projection/receptacle minimizes abrasion between adjacent block bodies as the projection moves into and is withdrawn from the receptacle in use.

In a preferred form, the first and second block bodies each have a base portion, a head portion and a neck/pillar portion connecting between the base portion and head portion, with there being a slot between the head and base portions in which the endless band is captively held.

The channel structure can be similar to that previously described for directing lubricant from the point between the block body and endless band to outside of the block bodies.

The invention also contemplates the combination of channel structure for simultaneously lubricating the connecting structure and the slot in the block bodies that receives the endless band. Porous material can also be placed in the channel structure as previously described.

The invention further contemplates a block body having a base defining drive/driven surfaces for engagement with a pulley, a head portion, a neck/pillar portion connecting between the base and head portions to maintain the head and base portions in a predetermined spaced relationship with a slot therebetween for reception of an endless band, and channel structure for guiding lubricant through the block body from the slot to a location outside of the block body.

The channel structure can include, for example, a bore extending fully through the block body in a fore and aft direction, a channel communicating from the bore into the apex of the head portion and a channel communicating from the slot to the bore. The channels can be straight, but preferably the channel from the bore to the slot is non-straight and exposed at least one of the leading and trailing faces of the block body to cause the distribution of a substantial amount of lubricant over the one face.

The invention further contemplates a block body with a base, head portion, and neck/pillar portion as described above, further including guide structure on adjacent block bodies with channel structure for guiding lubricant through one of the block bodies from the guide structure.

The channel structure may include, for example, a through bore in the head portion, a channel communicating between the bore and the apex of the head portion and a channel communicating from the guide structure to the bore.

The channel structure is preferably exposed at at least one of the leading and trailing block body faces so that the contacting area of the head and neck/pillar portions between adjacent block bodies is lubricated to reduce wear therebetween.

Lubricant is stored effectively in the block body cavities and through bores to be distributed therefrom through the channels. The channel from the through bore to the apex assures that lubricant is evenly distributed at the upper region of the head portion. The lubricant flows upwardly out of the head portions for superior lubrication. The through bore is replenished with lubricant driven by centrifugal force from the cavity into the through bore through one or more channels.

The invention still further contemplates a block body pair for sliding engagement with an endless band to be trained around a pair of pulleys, which block body pair consists of: first and second block bodies each having a base portion defining laterally spaced pulley-engaging surfaces, a head portion, a neck/pillar portion connecting between the base portion and the head portion to maintain the base and head portions a predetermined distance away from each other with a slot being defined therebetween for reception of an endless band, and oppositely facing leading and trailing faces; a projection on one of the leading and trailing faces on one of the first and second block bodies, which projection has a substantially circular first cross section taken in a vertical plane extending laterally through the one of the first and second block bodies; and a receptacle in the other of the leading and trailing faces on the other of the first and second block bodies which has a non-circular second cross section taken in a vertical plane extending laterally through the other of the first and second block bodies.

Preferably, the receptacle has an elliptical second cross section with the major axis of the elliptical second cross section extending in a lateral direction.

This construction allows relative lateral shifting between adjacent block bodies to accommodate, for example, speed shifting. Preferably, the relative lateral shifting permitted is in the range of 0.04 to 0.1 mm. This obviates the need for the block bodies to self adjust by twisting, which places undesired stresses on the endless band. The life of the endless band is resultingly increased.

The invention still further contemplates a block body pair with a projection and receptacle, one each on the block bodies in the pair and having first and second cross sections taken in a vertical plane extending laterally through the block bodies, with the first and second cross sections being dimensioned to allow relative shifting between the projection and receptacle in at least one of the vertical and lateral directions.

Preferably, the amount of shifting is on the order of between 0.04 to 0.1 mm. Preferably, the second receptacle cross section has a larger lateral dimension than vertical dimension to accommodate relative lateral shifting between the block bodies in the pair.

The invention still further contemplates a block body for sliding engagement with an endless band to be trained around a pair of pulleys, which block body has a base portion defining laterally spaced pulley-engaging surfaces, a head portion, a neck/pillar portion, and oppositely facing leading and trailing faces. The first and second laterally spaced projections are provided on one of the leading and trailing faces on the neck/pillar portion for engagement with corresponding receptacles on an adjacent block body.

This latter configuration limits skewing of adjacent block bodies by relative rotation about the fore and aft axes for the block bodies.

In one form, the neck/pillar portion has laterally spaced edges and the projections are provided one each at the laterally spaced edges of the neck/pillar portion.

Alternatively, to limit relative rotation of the block bodies about the fore and aft axis, a single projection can be keyed in its receptacle. This can be accomplished by making the matching cross sections of each of the projections and receptacles non-circular, i.e. square, rectangular, oval, or other polygonal shapes.

Preferably, the projections penetrate the cooperating receptacles therefor at all times, as when the belt conforms to a small diameter pulley, to prevent misalignment between adjacent block bodies and possible interference between the projection and an adjacent block body as the projection moves to reenter the receptacle.

With the inventive structure, the adjacent, aligned block bodies smoothly enter into the pulley grooves. This avoids noise development that would otherwise occur as misaligned block bodies impact a pulley. In addition to reducing noise, vibration development is minimized as is wear on the belt and pulley. The result is that the belt positively drives, and is positively driven by, the pulleys.

BRIEF DESCRIPTION OF THE DRAWINGS

FIG. 4 is a cross-sectional view of the inventive transmission belt taken along line 4—4 of FIG. 2;

FIG. 5 is a view as in FIG. 3 with the block body modified to include additional channel structure for guiding the delivery of a lubricant;

FIG. 6 is an elevation view of a modified form of transmission belt, according to the present invention, from one end of a block body operatively positioned on an endless band;

FIG. 7 is a view as in FIG. 6 taken from the block body end opposite that in FIG. 6;

DETAILED DESCRIPTION OF THE DRAWINGS

Figure 1:
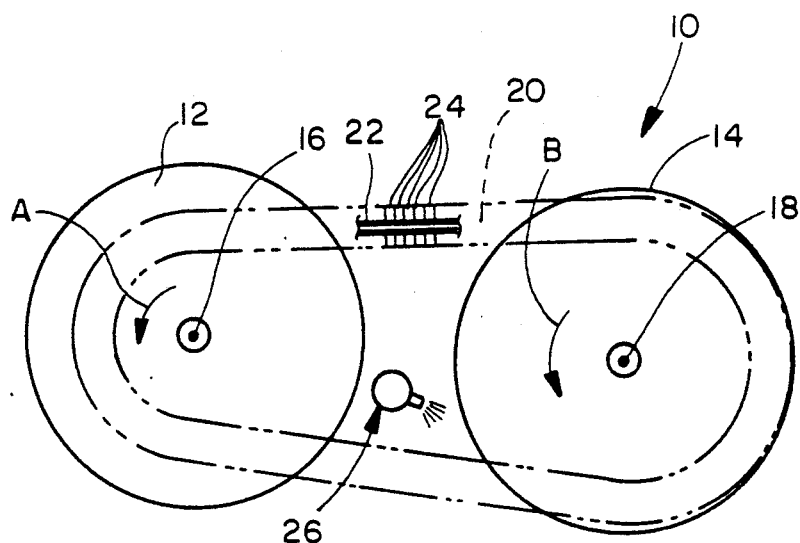
FIG. 1 is a schematic, side elevation view of a conventional force transmission belt with block bodies operatively positioned on an endless band trained about spaced pulleys and with a lubricant being propelled against the force transmission belt at the point where it enters a driven pulley.

In FIG. 1, a prior art transmission system is shown at 10 including a drive pulley 12 and a driven pulley 14 rotatable about spaced, parallel axes 16, 18, respectively, in the direction of arrows A and B. A force transmission belt 20 is trained around the pulleys 12, 14, and has an endless band 22 on which a plurality of block bodies 24 are slidably mounted.

A lubrication source 26 resides within the periphery of the belt loop and propels lubricant outwardly towards the region at which the belt 20 moves against the driven pulley 14. The problem with the lubrication system in FIG. 1 is that a substantial amount of the lubricant will contact the rotating driven pulley 14. The centrifugal force produced by the rotation of the pulley 14, particularly at high speeds, causes the lubricant to spray radially outwardly from the pulley 14 and thus the belt 20 which it draws in an arcuate path, so that a substantial portion of the delivered lubricant produces no beneficial effect. One of the objectives of the present invention is to avoid the shortcomings of a system such as that in FIG. 1.

Figure 2:
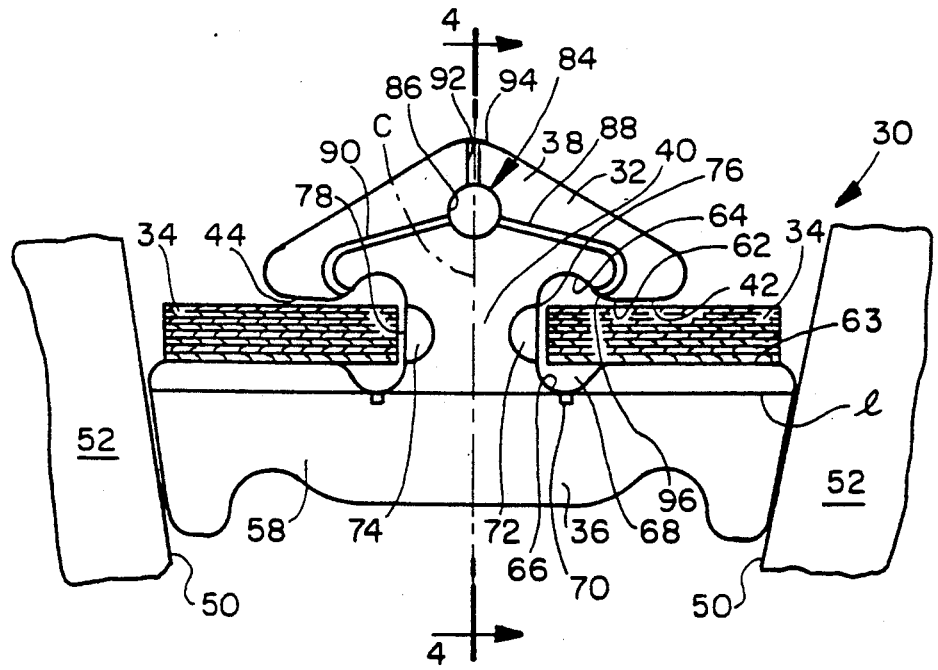
FIG. 2 is an elevation view of a transmission belt, according to the present invention, taken from one end of a block body operatively positioned on an endless band.
Figure 3:
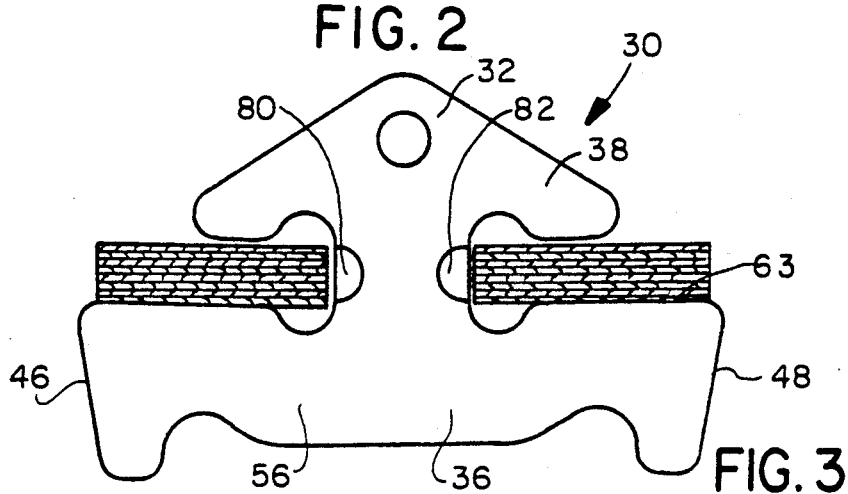
FIG. 3 is a view as in FIG. 2 taken from the block body end opposite that in FIG. 2.

In FIGS. 2-4, a first form of transmission belt, according to the present invention, is shown at 30. The belt 30 consists of a plurality of block bodies 32 arranged slidably along the length of an endless, multi-layered steel band 34, which is arranged to be trained around a pair of cooperating pulleys. The block bodies 32 are arranged around the entire length of the band 34 in abutting relationship, each to adjacent block bodies on its opposite faces. The endless band 34 may be pretensioned so that there is a residual force causing the block bodies 32 to be borne against each other.

Each block body 32 consists of a base portion 36, an inverted, V-shaped head portion 38, and a neck/pillar portion 40 connecting between the base and head portions 36, 38, respectively, to maintain the same in a predetermined spaced relationship and define spaced, laterally opening slots 42, 44 therebetween. Each slot 42, 44 is dimensioned to receive a flexible band 34. The base portion 36 of each block body 32 has laterally oppositely facing, inclined side surfaces/edges 46, 48 to engage correspondingly inclined surfaces 50 (one shown) on a pulley 52.

Each block body 32 has oppositely facing, leading and trailing faces, 54, 56, spaced in a fore and aft direction. The leading face 54 has a portion 58 that is inclined to the vertical, from a laterally extending inclination line L, to allow the block bodies 32 to pivot relative to each other to conform to the curvature of the pulley 52 in operation. As can be seen in FIG. 4, the block bodies 32 reposition by pivoting about an edge 60, coincident with the line L, which serves as a fulcrum, to bring the trailing face 56 facially against the leading face 54 on an adjacent, trailing block body 32. The belt pitch line P coincides with the edge 60 on which the block bodies 32 pivot as well as with the inclination line L of the base portions 36 of the block bodies 32.

The slots 42, 44 in the block bodies 32 are similar in configuration, and thus exemplary slot 42 will be used herein for purposes of illustration. The slot 42 has a vertical dimension between the underside surface 62 of the head 38 and a facing base surface 64 that is slightly larger than the vertical dimension of the band 34.

A curved, downwardly opening upper recess 64 is provided in the head 38. A like, lower, upwardly opening recess 66 is provided on the base 36 so that the recesses 64, 66 cooperatively define a cavity 68 surrounding the laterally innermost portion of the band 34 and defining a lubricant reservoir, the function of which is described more fully below. The bottom of the recess 66 coincides with the inclination line L. An undercut lubricant guiding channel 70 extends from the front to the rear of the block body 32 and communicates with the lower recess.

The neck/pillar portion 40 of the block body 32 has similarly-shaped projections 72, 74. The projections 72, 74 are provided one each adjacent laterally oppositely facing side edges 76, 78 on the neck/pillar portion 40. The projections 72, 74 are spaced equidistantly from the block body center line C and each have a truncated cylindrical configuration.

On the opposite/trailing surface 56 of the block body 32, receptacles 80, 82 are provided for the projections 72, 74, respectively, on an adjacent block body 32. The cooperating projections 72, 74 and receptacles 80, 82 guidingly control relative vertical and lateral movement between adjacent block bodies 24 to maintain alignment of the pulley engaging side surfaces 46, 48 on the block bodies 32 to account for smooth entry into and withdrawal of the belt 30 from pulley grooves. The spaced arrangement of the projections 72, 74 and receptacles 80, 82 prevents the adjacent block bodies 32 from rotating relative to each other about the fore and aft axes for the block bodies.

The projections 72, 74 and receptacles 80, 82 are relatively dimensioned so that the projections 72, 74 at all times penetrate the receptacles 80, 82. As seen in FIG. 4, the two block bodies 32 on the righthand side of that Figure are tilted to a maximum position i.e. to accommodate the smallest possible diameter pulley 52. In that position, the projections 72 remain within the receptacles 80. In the absence of this feature, the adjacent block bodies 32 might misalign relative to each other which may further result in the projections 72, 74 not properly reseating in the receptacles 80, 82. The misaligned block bodies 32 may thus forcibly impact the pulleys 52 which may generate unwanted noise and cause wear on the belt 30 and/or pulley 52, which may precipitate early system failure.

The invention further contemplates channel means at 84 for controllably guiding the passage of lubricant from the cavity 68 to a point externally of the block body 32. The channel means 84 includes a bore 86 extending fully through the block body head 38 in a fore and aft direction. A channel 88 communicates between the bore 86 and the cavity 68, with their being a similar channel 90 projecting oppositely away from the through bore 86. The cavity 68 defines a reservoir for lubricating oil which lubricates the engaging surfaces on the block body 32 and band 34 within the cavity 68. A separate channel 92 communicates between the bore 86 and the apex 94 of the inverted, V-shaped head portion 38.

In operation, lubricating oil flows from the cavity 68 by centrifugal force to an inlet 96 to the channel 88, through the bore 86 and into the channel 92. Through this arrangement, oil flows out of the channels 88, 90, 92 at the head portion 38 so that the contacting surfaces between adjacent block bodies 32 is effectively lubricated to minimize wear therebetween during operation. Lubrication is enhanced by the lubricant flowing from the bore 86 to the channel 92 and to the top of the head portion 38 of the block body 32.

The bore 86 preferably has a diameter of 2-3 mm. The lubricating channels 88, 90 have preferably a width in the range of 0.4 to 0.8 mm and a depth of 0.2 to 0.4 mm. These dimensions assure proper lubrication without compromising the integrity of the block body.

In the slackened portions of the belt, a supply of lubricant in the bore 86 is constantly delivered through the channels 88, 90 from the point at which the band 34 occupies the slot 42. To enhance the amount of lubrication on the face(s) of the block body head 38, the channels 88, 90 can be made longer i.e. to define a more circuitous route to cover more of the surface area of the head 38 on at least one of the faces 54, 56 thereon.

A modified form of the block body 32 in FIGS. 2-4 is shown in FIG. 5. In FIG. 5, the block body has vertical channels 98, 100 communicating from the bottom side 102 of the block body 32 to the cavities 68 between the head 38 and base 36 of each block body 32.

By feeding the cavity 68 continuously with lubricant, in addition to reducing wear between the band 34 and block bodies 32, the lubricant spreads over the projections 72, 74 and receptacles 80, 82 to facilitate entry of the projections 72, 74 into the receptacles 80, 82 and withdrawal therefrom with minimal wear and resistance.

It should be understood that while all of the channel means 84 described herein are shown to be on one surface of the block body, the invention also contemplates, for enhanced lubrication, that the channel means 84 could be provided on both surfaces 54, 56 of the block bodies 32.

Figure 8:
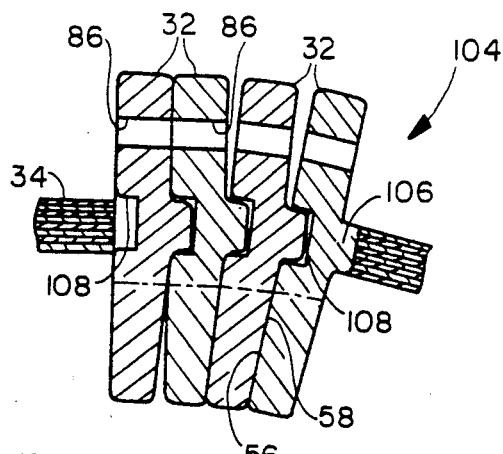
FIG. 8 is a cross-sectional view of the modified transmission belt taken along line 8—8 of FIG. 6.

In FIGS. 6-8, a modified form of transmission belt, according to the present invention, is shown at 104. Elements on the belt 104 corresponding to those on the belt 30, shown in FIGS. 3-4, are correspondingly numbered. The belt 104 has corresponding block bodies 32, each having a base portion 36, a head portion 38 and an interconnecting neck/pillar portion 40.

Instead of the pairs of projections 72, 74 and receptacles 80, 82, a single projection 106 is provided on the leading block body face 54 for receipt in a receptacle 108 on the trailing block body surface 56. The projection 106 has a cylindrical configuration along substantially its entire extent in a fore and aft direction and is symmetrical about the vertical center line C for the block body 32. The projection 106 and receptacle 108 are provided in the neck/pillar portion 40 of the block body 42 with their centers at the intersection of the vertical center line C and the lateral center line M of the endless band 34. Alternatively, as shown in phantom lines in FIGS. 6 and 7, the projection 106 and receptacle 108 can be positioned lower on the block body 32 so that the bottoms of the projection 106 and receptacle 108 coincide with the inclination line L.

The cooperating projection 106 and receptacle 108 guide relative movement between adjacent block bodies 32. As seen in FIG. 8, the projection 106 remains within the receptacle 108 for the maximum bending contemplated for the belt 104 i.e. with the belt 104 conforming to the smallest possible pulley diameter. As seen in FIG. 8, this condition exists when the inclined portion 58 on the leading surface 54 of one block body 32 facially engages the trailing surface 56 on an adjacent block body 32.

Figure 9:
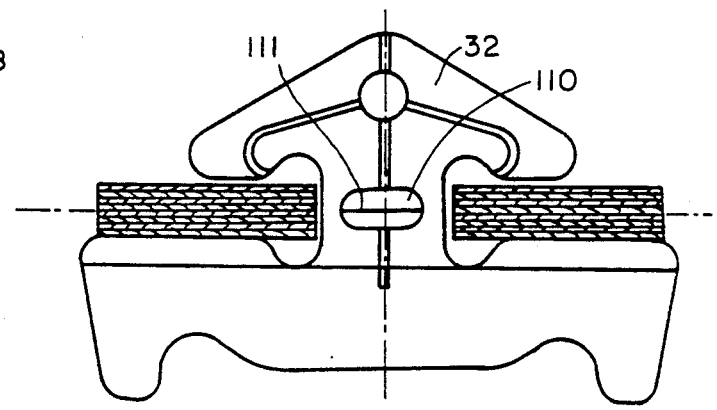
FIG. 9 is an end elevation view of a further modified form of transmission belt according to the present invention.

While the projection 106 and receptacle 108 therefor are shown to have a circular cross section taken in a vertical plane, the invention is not so limited. As seen in FIG. 9, the projection 110 and cooperating receptacle (not shown) can have an oval/elliptical cross section with the major axis 110 of the elliptical cross section extending generally laterally of the block body 32. Other configurations for the receptacles/projections are contemplated. For example, a square/rectangular cross section operates effectively. Any configuration that would key the projection within the recess to prevent relative rotation between adjacent block bodies 32 about a fore and aft axis are contemplated by the invention.

As in the earlier described belt embodiment 30, the block bodies 32 in FIGS. 6-9 are provided with a through bore 86, which is shown to be circular in cross section, but which could be rectangular, oval, square, or the like. The bore 86 communicates through channels 88, 90 with the cavity 68. The channels 88, 90 communicate through the bore 86 to a channel 92 communicating upwardly to the apex 94 of the head 38 as in the prior embodiment. Lubricating oil from below each block body 32 at the loosened side of the block bodies 32 is stored in the cavities 68 from where the oil flows upwardly by centrifugal force into the channels 88, 90 into the bore 86 for storage therein. From the bore 86, the lubricant flows out of the channel 92 at the top of the head 38 as in the prior embodiment.

To reduce noise between adjacent block bodies 32 and to avoid wear on the guiding projection 106 and receptacle 108, an additional channel 112 is provided and is coincident with the vertical center line C of each block body 32. The channel 112 originates in the base portion 36 beneath the line L and extends upwardly into communication with the bore 86. While the additional channel 112 is provided on the leading surface 54, it could be likewise provided on the trailing surface 56 to communicate with the receptacle 108 in like fashion.

Figure 10:
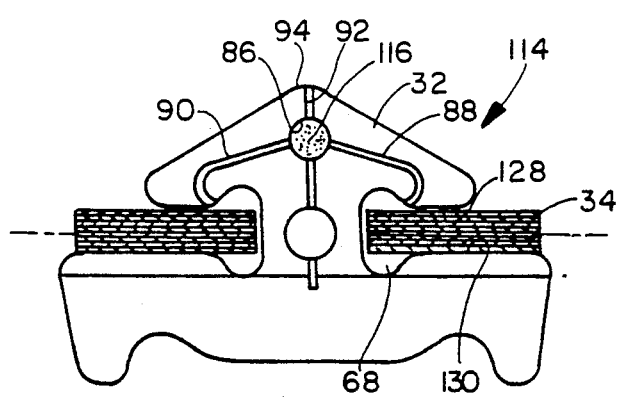
FIG. 10 is an elevation view of a further modified form of transmission belt, according to the present invention, taken from one end of a block body operatively positioned on an endless band.
Figure 11:
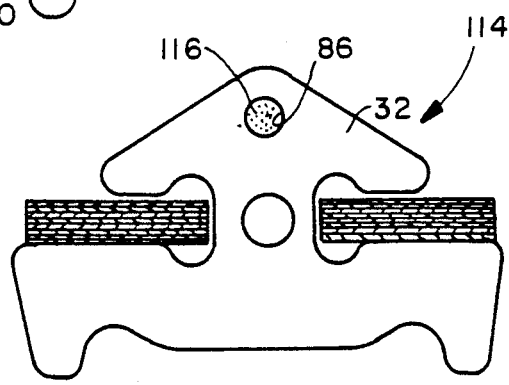
FIG. 11 is a view as in FIG. 10 taken from the block body end opposite that in FIG. 10.
Figure 12:
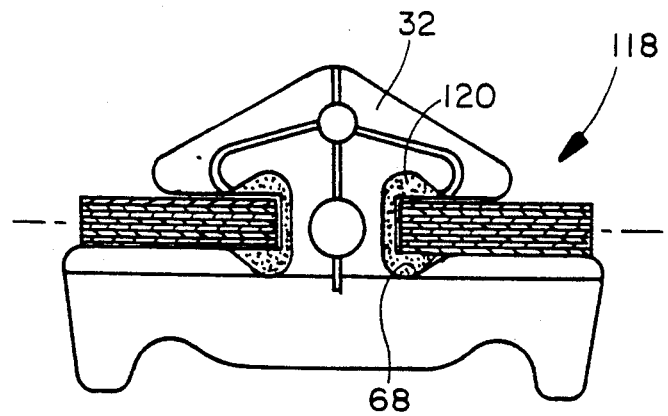
FIG. 12 is an elevation view of a still further modified form of transmission belt, according to the present invention, taken from one end of a block body operatively positioned on an endless band.
Figure 13:
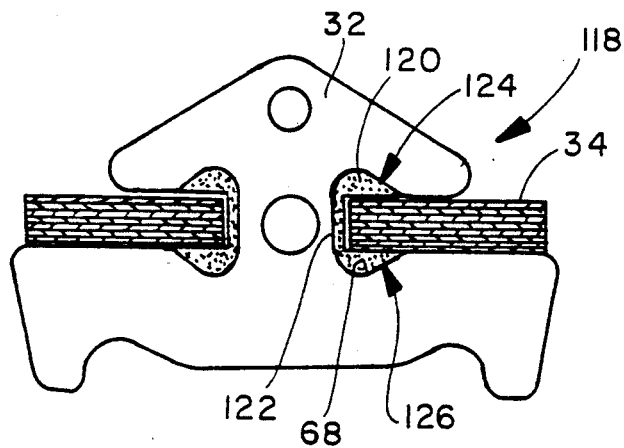
FIG. 13 is a view as in FIG. 12 taken from the block body end opposite that in FIG. 12.

In FIGS. 10 and 11, a modified form of belt is shown at 114, with the belt being similar to that 104, shown in FIGS. 6-8. The only difference between the belt 114 and that 104 is that a porous material 116 is positioned in the bore 86 to substantially fill the bore 86. In FIGS. 12 and 13, a belt 118 is shown that is similar to that 104 in FIGS. 6-8, with the difference being that a porous material 120 is provided in the cavities 68 for retaining lubricant therewithin. The invention also contemplates that the porous materials 116, 120 can both be provided in the same belt block body 32.

Preferably, the porous material 116, 120 is firmly attached to the block body 102. As seen in FIGS. 12 and 13, that portion 122 of porous material 120 that is at the height of the steel band 34 may, over time, be worn down. Consequently, it may be desirable to provide two unconnected pieces of material to fill the upper portion 124 of the cavity and the lower portion 126 of the cavity, given that the connecting portion 122 might ultimately be worn out by the band 34.

The lubricant in the porous material 116 flows by centrifugal force through the channel 92 to the head apex 94. Lubricant from the porous material 116 also flows readily downwardly through the channels 88, 90 to the cavity 68 to lubricate the head surface 128 and base surface 130 between which the band 34 resides. By lubricating the block body 32 and band 34, wear between the block body 32 and band 34 and heat generation are minimized.

The material 116, 120 is made preferably of a highly porous or a fibrous material. The porous material is made by molding and sintering metal powder under pressure with a filler (in an amount of approximately 20-30%) therein to define a fluid path in the sintered material to permit impregnating of the material with lubricating oil. The metal material is preferably one of iron powder, copper powder, tin powder, carbon, or alloy powder. Alternatively, a sintered transition metal carbide such as WC, TiC, TaC or $CR_3C_2$ in combination with an iron system metal binder such as Co, Ni, or Fe can be used. A synthetic resin material of polytetrafluoroethylene can also be used.

The fiber material, when used, is preferably made of a natural fiber, or a flock or short fiber of woven, knit or unwoven synthetic fiber. Such a fiber member is preferably bonded with an adhesive to the surface surrounding the bore 86 and to that portion of the block body 32 bounding the cavity 68. When a short fiber is used, it is preferably flocked by spraying the same onto the surface.

Figure 14:
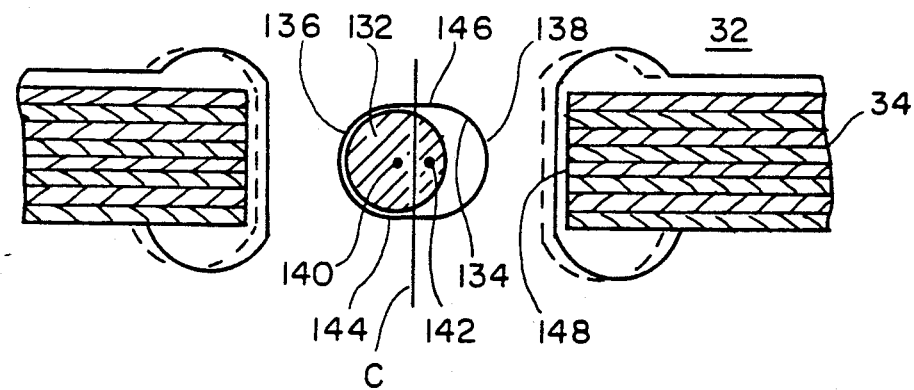
FIG. 14 is an enlarged end elevation view of two cooperating bodies, according to the present invention, showing the permissible range of relative lateral movement between the blocks.

In FIG. 14, the relative movement contemplated by the invention between a projection 132 on one block body 32 for reception in a receptacle 134 on an adjacent block body 32 is shown. The projection 132 has a circular cross section, while the receptacle 134 is elliptical.

The elliptical receptacle 134 is defined by arcuate surfaces 136, 138 having centers 140, spaced based equidistantly from the vertical center line c. Straight sections 144, 146 connect between the arcuate surfaces 136, 138 at points tangent thereto. Curved sections (not shown) could be substituted for the straight sections 144, 146.

As previously discussed, this arrangement of the projection 132 and receptacle 134 provides sufficient clearance to compensate for a misalignment in the widthwise direction of each block body 32. The projection 132 is allowed to move laterally within the receptacle 134 as to accommodate speed shifting in an automobile system, or the like.

The invention also contemplates that the projection 132 can have other than a circular configuration. However, regardless of the shape chosen, it is preferred that the range of relative lateral movement of the projection 132 in the receptacle 134 be within the 0.04 to 0.1 mm range.

If the lateral clearance is less than 0.04 mm, the normal contemplated lateral misalignment of the belt cannot be sufficiently compensated for. Clearance in excess of 0.1 mm allows sufficient lateral shifting of the block bodies 32 that the block bodies may become substantially misaligned and collide with the pulleys upon engaging the same. This results in vibration of the block bodies and wear that might precipitate premature failure.

As seen in FIG. 14, the band 34 and block bodies 32 are relatively dimensioned so that throughout the range of relative shifting, the laterally inwardmost edge 148 of the band 34 does not contact the neck/pillar 40 of the belt body 32. The spacing between the neck/pillar 40 and band 34 thus generally determines the maximum amount of relative shifting that should be allowed between adjacent block bodies. Thus, no additional stress is provided on the band 34 by allowing the lateral shifting between the block bodies 32. The lateral shifting between the block bodies 32 can occur smoothly with the projection 132 within the receptacle 134 without requiring twisting of the band 34 as would occur in the absence of the inventive structure.

The foregoing disclosure of specific embodiments is intended to be illustrative of the broad concepts comprehended by the invention.

We claim:

1. A force transmission belt comprising:
   a plurality of block bodies each having laterally spaced pulley-engaging surfaces;
   an endless band to be trained about a pair of pulleys;
   cooperating means on the endless band and the block bodies for maintaining the block bodies in operative position on the endless band in which the block bodies are slidable lengthwise of the endless band and positioned so that the laterally spaced pulley-engaging surfaces can frictionally engage a pulley about which the endless band is trained; and
   channel means in at least one of the block bodies for guiding lubricant from a point between the one block body and the endless band to a location outside of the one block body to minimize wear between the adjacent block bodies,
   said channel means including a non-straight channel requiring lubricant to follow a non-straight path in moving through the one block body between said point between the one block body and endless band and the location outside the one block body.

2. The force transmission belt according to claim 1 wherein said one block body has a base portion defining the pulley-engaging surfaces, a head portion and a neck/pillar portion connecting between the base portion and head portion, said endless band being captively held between the head and base portions; said non-straight channel extending through the head portion.

3. The force transmission belt according to claim 2 wherein the one block body base has a bottom side and the channel means includes a channel extending from the bottom side of the one block body base upwardly through the one block body base to said point.

4. A force transmission belt comprising:
   a plurality of block bodies each having laterally spaced pulley-engaging surfaces;
   an endless band to be trained about a pair of pulleys;
   cooperating means on the endless band and the block bodies for maintaining the block bodies in operative position on the endless band in which the block bodies are slidable lengthwise of the endless band and positioned so that the laterally spaced pulley-engaging surfaces can frictionally engage a pulley about which the endless band is trained; and
   channel means in at least one of the block bodies for guiding lubricant from a point between the one block body and the endless band to a location outside of the one block body to minimize wear between the adjacent block bodies,
   wherein said one block body has a base portion defining the pulley-engaging surfaces, a head portion and a neck/pillar portion connecting between the base portion and head portion, said endless band being captively held between the head and base portions,
   wherein the channel means includes a channel extending through the one block body head to said point.

5. The force transmission belt according to claim 2 wherein the one block body has a leading and a trailing face spaced in a fore and aft direction and the channel means includes a bore extending fully through the one block body in the fore and aft direction, said bore being fully surrounded by the block body.

6. The force transmission belt according to claim 5 wherein the channel means includes a channel communicating between the bore and said point.

7. A force transmission belt comprising:
   a plurality of block bodies each having laterally spaced pulley-engaging surfaces;
   an endless band to be trained about a pair of pulleys;
   cooperating means on the endless band and the block bodies for maintaining the block bodies in operative position on the endless band in which the block bodies are slidable lengthwise of the endless band and positioned so that the laterally spaced pulley-engaging surfaces can frictionally engage a pulley about which the endless band is trained; and
   channel means in at least one of the block bodies for guiding lubricant from a point between the one block body and the endless band to a location outside of the one block body to minimize wear between the adjacent block bodies,
   wherein said one block body has a base portion defining the pulley-engaging surfaces, a head portion and a neck/pillar portion connecting between the base portion and head portion, said endless band being captively held between the head and base portions, wherein the one block body has a leading and a trailing face spaced in a fore and aft direction and the channel means includes a bore extending fully through the one block body in the fore and aft direction;

wherein the bore extends through the head on the one block body.

8. The force transmission belt according to claim 7 wherein the one block body head has a top side with an apex thereat and the channel means includes a channel communicating from the bore to the apex.

9. The force transmission belt according to claim 1 wherein the one block body has a top and bottom and there is a recess in said one block body defining a cavity bounded by the endless band and a downwardly facing surface on the one block body to define a lubricant reservoir at said point.

10. The force transmission belt according to claim 9 wherein there is a porous material in said cavity for retaining a supply of lubricant, said porous material having a different porosity than the material defining the one block.

11. The force transmission belt according to claim 1 wherein there is a porous material in at least a part of said channel means for retaining a supply of lubricant, said porous material having a different porosity than the material defining the one block.

12. A force transmission belt comprising:
a plurality of block bodies each having laterally spaced pulley-engaging surfaces and leading and trailing faces;
an endless band to be trained about a pair of pulleys;
cooperating means on the endless band and the block bodies for maintaining the block bodies in operative position on the endless band in which the block bodies are slidable lengthwise of the endless band and positioned so that the laterally spaced pulley-engaging surfaces can frictionally engage a pulley about which the endless band is trained;
a projection on one of the leading and trailing faces of a first one of the block bodies;
a receptacle for the projection on the other of the leading and trailing faces of a second of the block bodies adjacent to the one block body,
said projection being extendable into the receptacle to maintain the first and second block bodies in a desired relative operative relationship; and
channel means in at least one of the first and second block bodies for guiding lubricant from a point between at least one of the projection and receptacle to a location outside of the one block body to facilitate movement of the projection within the receptacle and minimize wear between adjacent block bodies.

13. The force transmission belt according to claim 12 wherein said channel means includes means in at least one of the first and second block bodies for guiding lubricant from a point between the one block body and endless band to a location outside of the one block body to minimize wear between adjacent block bodies.

14. The force transmission belt according to claim 13 wherein there is a recess in the one of the first and second block bodies defining a cavity bounded by the endless band and the one of the first and second block bodies to define a lubricant reservoir at said point.

15. The force transmission belt according to claim 13 wherein there is a porous material in at least one of said cavity and at least a part of said channel means for retaining a supply of lubricant.

16. A force transmission belt comprising:
a plurality of block bodies each having laterally spaced pulley-engaging surfaces;
an endless band to be trained about a pair of pulleys;
cooperating means on the endless band and the block bodies for maintaining the block bodies in operative position on the endless band in which the block bodies are slidable lengthwise of the endless band and positioned so that the laterally spaced pulley-engaging surfaces can frictionally engage a pulley about which the endless band is trained; and
a projection on one of the leading and trailing faces of a first one of the block bodies;
a receptacle for the projection on the other of the leading and trailing faces of a second of the block bodies adjacent to the one block body,
said projection being extendable into the receptacle to maintain the first and second block bodies in a desired relative operative relationship; and
channel means in at least one of the first and second block bodies for guiding lubricant from a point between at least one of the projection and receptacle to a location outside of the one block body to facilitate movement of the projection within the receptacle and minimize wear between adjacent block bodies,
wherein said first and second block bodies each have a base portion defining the pulley-engaging surfaces, a head portion and a neck/pillar portion connecting between the base portion and head portion, said endless band being captively held between the head and base portions,
wherein said head portion has a top side and the channel means includes a channel extending from the projection/receptacle on the one of the first and second block bodies to the top side of the head on at least one of the first and second block bodies.

17. The force transmission belt according to claim 16 wherein the first and second block bodies each have oppositely facing leading and trailing faces and the channel comprises an undercut in at least one of the leading and trailing faces on the one of the first and second block bodies.

18. The force transmission belt according to claim 16 wherein the first and second block bodies each have oppositely facing leading and trailing faces and the channel means include a bore extending fully through the one of the first and second block bodies between the leading and trailing faces thereon.

19. The force transmission belt according to claim 18 wherein the bore extends through the head portion of the one of the first and second block bodies and there is a porous material in the bore for retaining a supply of lubricant.

20. A block body for sliding engagement with an endless band to be trained around a pair of pulleys, said block body being operatively positioned on an endless band to drive/be driven by a pulley about which the endless band is trained, said block body comprising:
a base defining drive/driven surfaces for engagement with a pulley;
a head portion;
a neck/pillar portion connecting between the base and head portions to maintain the head and base portions in a predetermined spaced relationship with a slot therebetween for reception of an endless band; and channel means for guiding lubricant through the block body from the slot to a location outside of the block body, said channel means including at least one non-straight channel for guiding lubricant in a non-straight path between the slot and a location outside of the block body.

21. The block body according to claim 20 wherein said block body has leading and trailing faces, the head portion has an apex and the channel means includes a bore extending fully through the block body between the leading and trailing faces thereon.

22. A block body for sliding engagement with an endless band to be trained around a pair of pulleys, said block body being operatively positioned on an endless band to drive/be driven by a pulley about which the endless band is trained, said block body comprising:

a base defining drive/driven surfaces for engagement with a pulley;

a head portion;

a neck/pillar portion connecting between the base and head portions to maintain the head and base portions in a predetermined spaced relationship with a slot therebetween for reception of an endless band; and channel means for guiding lubricant through the block body from the slot to a location outside of the block body, wherein said block body has leading and trailing faces, the head portion has an apex and the channel means includes a bore extending fully through the block body between the leading and trailing faces thereon, wherein the channel means includes a channel communicating between the apex and the bore.

23. The block body according to claim 22 wherein the channel means includes a channel communicating between the slot and the bore.

24. The block body according to claim 23 wherein the channels are formed in at least one of the leading and trailing faces of the block body and at least one of the channels has a non-straight configuration to increase the amount of lubricant in said one channel.

25. A block body for sliding engagement with an endless band to be trained around a pair of pulleys, said block body having oppositely facing leading and trailing faces and being operatively positioned on an endless band to drive/be driven by a pulley about which the endless band is trained, said block body comprising:

a base defining drive/driven surfaces for engagement with a pulley;

a head portion;

a neck/pillar portion connecting between the base portion and head portion, said endless band being captively held between the head and base portions;

guide means on at least one of the leading and trailing faces to cooperate with an adjacent block to maintain an operative aligned relationship between adjacent block bodies; and channel means including a channel extending at least partially through the head for guiding lubricant through the one block body from the guide means to a location outside of the block body.

26. The block body according to claim 25 wherein the block body has leading and trailing faces, the head portion has an apex and the channel means includes a bore extending fully through the block body between the leading and trailing faces thereon, said block body completely surrounding the bore.

27. A block body for sliding engagement with an endless band to be trained around a pair of pulleys, said block body having oppositely facing leading and trailing faces and being operatively positioned on an endless band to drive/be driven by a pulley about which the endless band is trained, said block body comprising:

a base defining drive/driven surfaces for engagement with a pulley;

a head portion;

a neck/pillar portion connecting between the base portion and head portion, said endless band being captively held between the head and base portions;

guide means on at least one of the leading and trailing faces to cooperate with an adjacent block to maintain an operative aligned relationship between adjacent block bodies; and channel means for guiding lubricant through the one block body from the guide means to a location outside of the block body, wherein the block body has leading and trailing faces, the head portion has an apex and the channel means includes a bore extending fully through the block body between the leading and trailing faces thereon, wherein the channel means includes a channel extending from the apex of the head portion to the bore.

28. A block body for sliding engagement with an endless band to be trained around a pair of pulleys, said block body having oppositely facing leading and trailing faces and being operatively positioned on an endless band to drive/be driven by a pulley about which the endless band is trained, said block body comprising:

a base defining drive/driven surfaces for engagement with a pulley;

a head portion;

a neck/pillar portion connecting between the base portion and head portion, said endless band being captively held between the head and base portions;

guide means on at least one of the leading and trailing faces to cooperate with an adjacent block to maintain an operative aligned relationship between adjacent block bodies; and channel means for guiding lubricant through the one block body from the guide means to a location outside of the block body, wherein the block body has leading and trailing faces, the head portion has an apex and the channel means includes a bore extending fully through the block body between the leading and trailing faces thereon, wherein the channel means includes a channel extending from the apex of the head portion to the bore, wherein the channel means includes a channel extending from the guide means to the bore.

29. A block body pair for sliding engagement with an endless band to be trained around a pair of pulleys, said block body pair comprising:

first and second block bodies with a top and bottom and laterally spaced sides and each comprising a base portion defining laterally spaced pulley-engaging surfaces, a head portion, a neck/pillar portion connecting between the base portion and the head portion to maintain the base and head portions a predetermined distance away from each other with a slot being defined therebetween for reception of an endless band, and oppositely facing leading and trailing faces;

a projection on one of the leading and trailing faces on one of the first and second block bodies, said projection having a substantially circular first cross section taken in a vertical plane extending laterally through the one of the first and second block bodies; and a receptacle on the other of the leading and trailing faces on the other of the first and second block bodies, said receptacle having a non-circular, non-square second cross section taken in a vertical plane extending laterally through the other of the first and second block bodies, said receptacle having a longer dimension taken laterally than from top to bottom relative to the other block body.

30. The block body according to claim 29 wherein the projection and receptacle are keyed to each other to prevent relative rotation between the first and second block bodies about a fore and aft axis with the projection in the receptacle.

31. The block body pair according to claim 29 wherein the receptacle has an elliptical second cross section with the major axis of the elliptical second cross section extending in a lateral direction.

32. The block body pair according to claim 29 wherein the projection and receptacle are relatively dimensioned so that with the projection in the receptacle the projection can be laterally shifted within the receptacle from 0.04 to 0.1 mm.

33. A block body for sliding engagement with an endless band to be trained around a pair of pulleys, said block body comprising:

a base defining drive/driven surfaces for engagement with a pulley;

a head portion;

a neck/pillar portion connecting between the base portion and the head portion to maintain the base and head portions a predetermined distance away from each other with a slot being defined therebetween for reception of an endless band, said block body having oppositely facing leading and trailing faces; and first and second laterally spaced projections on one of the leading and trailing faces on the neck/pillar portion between the base and head portions for engagement within corresponding receptacles on an adjacent block body.

34. The block body according to claim 33 in combination with a second block body having laterally spaced first and second receptacles for the first and second projections with the first claimed and second block bodies operatively positioned on an endless band.

35. The block body according to claim 33 wherein the neck/pillar portion has laterally spaced edges and the first and second projections are provided one each at the laterally spaced edges of the neck/pillar portion.

* * * * *